(12) United States Patent
Lin

(10) Patent No.: US 6,488,874 B2
(45) Date of Patent: Dec. 3, 2002

(54) METHOD FOR MANUFACTURING AN ENVIRONMENTAL FRIENDLY MATERIAL

(76) Inventor: Bo-Hon Lin, No. 311, Liu Chiau E. Road, Wapei Village, Pu Hsin Hsiang, Chang Hua Hsien (TW)

( * ) Notice: Subject to any disclaimer, the term of this patent is extended or adjusted under 35 U.S.C. 154(b) by 41 days.

(21) Appl. No.: 09/826,918

(22) Filed: Apr. 6, 2001

(65) Prior Publication Data

US 2002/0145216 A1 Oct. 10, 2002

(51) Int. Cl.⁷ .............................................. B29C 44/02
(52) U.S. Cl. ...................................... 264/51; 264/45.3
(58) Field of Search .................................. 264/51, 45.3

(56) References Cited

U.S. PATENT DOCUMENTS

| | | | | |
|---|---|---|---|---|
| 3,927,159 A | * | 12/1975 | Tomikawa et al. | 264/45.3 |
| 4,154,785 A | * | 5/1979 | Inui et al. | 264/45.5 |
| 4,569,950 A | * | 2/1986 | Hoshi et al. | 521/88 |
| 4,820,469 A | * | 4/1989 | Walsh et al. | 264/506 |
| 5,145,606 A | * | 9/1992 | Omure et al. | 252/350 |
| 5,373,046 A | * | 12/1994 | Okamura et al. | 524/413 |
| 6,312,639 B1 | * | 11/2001 | Ertle et al. | 264/349 |

FOREIGN PATENT DOCUMENTS

CN 1237505 * 12/1999

* cited by examiner

*Primary Examiner*—Allan R. Kuhns
(74) *Attorney, Agent, or Firm*—Rosenberg, Klein & Lee

(57) ABSTRACT

A method for manufacturing a board includes step 1 to mix 49.8% to 97.8% of polyethylene, 50% to 2% of calcium carbonate and 0.2% of foaming agent, and step 2 to roll or press the mixture to become a board. The board can be burned without producing sticky remains.

2 Claims, 1 Drawing Sheet

--- to mix 49.8% to 97.8% of Polyethylene, 50% to 2% of Calcium Carbonate and 0.2% of foaming agent Step 1 to mold said mixture in step 1 to be a board

Step 2 to mix 49.8% to 97.8% of Polyethylene, 50% to 2% of Calcium Carbonate and 0.2% of foaming agent Step 1 to mold said mixture in step 1 to be a board

Step 2

METHOD FOR MANUFACTURING AN ENVIRONMENTAL FRIENDLY MATERIAL

FIELD OF THE INVENTION

The present invention relates to a method for manufacturing a material that is composed of polyethylene, calcium carbonate and foaming agent. The material can be molded to be desired shapes and generates no sticky remains after being burned.

BACKGROUND OF THE INVENTION

So many products are made by plastic which is easily shaped and manufactured in mass production. Nevertheless, plastic is not suitable to be burned and will generate sticky remains which is not friendly to the environment. Most of the metro cities use garbage burners to deal with the garbage and expect to reduce the amount of remains after burning the garbage. The plastic products leave sticky remains on the inside of the burners after burned and the sticky remains reduces the efficiency of the burners so that workers have to clean the sticky remains from the inside of the burners periodically. The sticky remains also shortens the life of use of the burners.

The present invention intends to provide a new material that replaces plastic material at a certain level and will not become sticky remains after being burned.

SUMMARY OF THE INVENTION

In accordance with one aspect of the present invention, there is provided a method for manufacturing a board and including step 1 to mix 49.8% to 97.8% of polyethylene, 50% to 2% of calcium carbonate and 0.2% of foaming agent, and step 2 to roll or press the mixture to become a 1 mm board. The board can be burned without producing sticky remains.

The primary object of the present invention is to provide a method for a new material that is easily to be shaped and board can be burn and produces no sticky remains.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
FIG. 1 is a flow chart to show the steps of the method of the present invention.

Referring to FIG. 1, the method for manufacturing a board includes the following two steps:

step 1: to mix 49.8% to 97.8% of Polyethylene, 50% to 2% of calcium carbonate and 0.2% of foaming agent at 150 to 200 degrees celsius, and step 2: to mold said mixture in step 1 to be a 1 mm board.

The mixture in step 1 can be mixed by 69.8% of polyethylene, 30% of calcium carbonate and 0.2% of foaming agent. The way to make the mixture to be a board can be any known method and the material can also be molded to be a final product such as a bowl or a shoe sole. The board can be burned and produces no sticky remains.

The material is easily to be manufactured and may replace plastic in many fields of products. The material provides an environmental friendly material.

While we have shown and described various embodiments in accordance with the present invention, it should be clear to those skilled in the art that further embodiments may be made without departing from the scope of the present invention.

What is claimed is:

1. A method for manufacturing a board, comprising the following steps:

step 1: mixing 49.8% to 97.8% of polyethylene, 50% to 2% of calcium carbonate and 0.2% of foaming agent, and step 2: molding said mixture in step 1 to form a board.

2. The method as claimed in claim 1 wherein a mixture temperature in step 1 is 150 to 200 degrees Celsius.

* * * * *